United States Patent [19]

Tanahashi et al.

[11] Patent Number: 4,629,035
[45] Date of Patent: Dec. 16, 1986

[54] SPEED CONTROL APPARATUS FOR ELEVATOR

[75] Inventors: Tooru Tanahashi, Gifu; Toshiaki Ishii, Ichinomiya; Shuzo Mitsui, Fujinomiya, all of Japan

[73] Assignee: Mitsubishi Denki Kabushiki Kaisha, Tokyo, Japan

[21] Appl. No.: 726,772

[22] Filed: Apr. 24, 1985

[30] Foreign Application Priority Data

May 2, 1984 [JP] Japan .................. 59-88637

[51] Int. Cl.⁴ .............................. B66B 1/30
[52] U.S. Cl. ..................... 187/29 R; 318/798
[58] Field of Search ............ 187/29; 318/334, 798, 318/806

[56] References Cited

U.S. PATENT DOCUMENTS

| | | | |
|---|---|---|---|
| 4,471,855 | 9/1984 | Nomura | 187/29 R |
| 4,510,548 | 4/1985 | Boothman | 318/806 X |
| 4,541,747 | 9/1985 | Imaizumi et al. | 318/334 X |
| 4,542,324 | 9/1985 | Leuthen | 318/798 |
| 4,567,419 | 1/1986 | Watanabe | 318/798 |

FOREIGN PATENT DOCUMENTS 54-147416 11/1979 Japan .

*Primary Examiner*—Vit W. Miska
*Assistant Examiner*—W. E. Duncanson, Jr.
*Attorney, Agent, or Firm*—Leydig, Voit & Mayer, Ltd.

[57] ABSTRACT

A speed control apparatus for an elevator in which a temperature detector for detecting the ambient temperature of an induction motor is disposed, and an arithmetic unit employing a microcomputer is additionally furnished with the function of evaluating the component of temperature rise of a rotor and obtaining the resistance value of the rotor by the use of this component of temperature rise and the temperature detection signal of the temperature detector, to evaluate the optimum instantaneous current command by the use of the temperature-compensated resistance value, whereby the overvoltage and the insufficient torque of the induction motor can be obviated.

8 Claims, 5 Drawing Figures

SPEED CONTROL APPARATUS FOR ELEVATOR

BACKGROUND OF THE INVENTION

1. Field of the Invention

The present invention relates to a speed control apparatus for an elevator wherein a cage is driven by supplying an induction motor with alternating current subjected to pulse width modulation.

2. Description of the Prior Art

FIG. 5 is a block diagram in which, by way of example, the arrangement of a prior-art speed control apparatus for an elevator disclosed in the official gazette of Japanese Patent Application Laying-open No. 56-123795 is shown along with a driving system for a cage. Referring to the figure, the alternating current of a three-phase A. C. power source 1 is rectified by a converter 2, and the rectified output is smoothed by a capacitor 3, whereupon alternating current subjected to pulse width modulation by an inverter 4 is applied to an induction motor 5. A speed detector 6 such as tachometer generator, and the sheave 7 of a hoisting machine are directly coupled to the induction motor 5. Further, a cage 9 is coupled to one end of a main rope 8 wound round the sheave 7, and a counterweight 10 to the other end thereof. Besides, the speed command S11 of a speed command generator 11 as a reference for driving the cage at an appropriate speed and the speed detection signal S6 of the speed detector 6 are input to a microcomputer 20, in which for the purpose of the vector control of the induction motor 5, a slip frequency command and a primary current command are calculated and also the instantaneous current command S20 of the induction motor 5 is evaluated. This instantaneous current command is applied to a pulse width modulation circuit (hereinbelow, called "PWM circuit") 13 along with the current detection signal S12 of a current detector 12 which detects the output current of the inverter 4. The PWM circuit 13 calculates the deviation between the instantaneous current command S20 and the current detection signal S12, prepares a pulse width modulation signal for rendering this deviation null, and applies this signal to a base drive circuit 14. The base drive circuit 14 prepares the base signals of transistors constituting the inverter 4 on the basis of the pulse width modulation signal, so as to control the "on" times of the transistors.

The microcomputer 20 is composed of interface circuits 21 and 22 for accepting the speed command S11 and the speed detection signal S6, a microprocessor 23, a ROM 24 and a RAM 25 for storing the data and programs of the microprocessor, and a D/A converter 26 for converting a digital quantity into an analog quantity and delivering the latter as the output.

Since the control circuitry shown in FIG. 5 subjects the induction motor 5 to the slip frequency control, the microcomputer 20 executes the calculation of the following equation:

$$I_1 = I_M \sqrt{1 + \left(\frac{L_2}{R_2} \cdot \omega_s\right)^2} \tag{1}$$

where
$I_1$: primary current value,
$I_M$: secondary excitation current,
$L_2$: secondary inductance,
$R_2$: secondary resistance,
$\omega_s$: slip frequency command.

In this regard, the secondary resistance $R_2$ in Eq. (1) ought to differ depending upon the ambient temperature of the induction motor and the temperature of the rotor thereof and changes in a relationship indicated by the following equation by way of example:

$$R_2 = R_{20} \cdot \frac{234.5 + t}{234.5 + t_0} \tag{2}$$

where
$R_2$: secondary resistance at a temperature t,
$R_{20}$: secondary resistance at a temperature $t_0$.

Nevertheless, in the prior-art speed control apparatus shown in FIG. 5, a fixed value has been employed as the secondary resistance. This has led to the disadvantage that the overvoltage of the induction motor is incurred in the situation in which the secondary resistance value is large due to the temperature rise of the rotor, whereas the voltage of the induction motor lowers to incur an insufficient torque in the situation in which the secondary resistance value is small due to a low temperature.

SUMMARY OF THE INVENTION

The present invention has been made with the object of eliminating the disadvantage mentioned above, and proposes a speed control apparatus for an elevator in which a temperature detector for detecting the ambient temperature of an induction motor is disposed, and an arithmetic unit employing a microcomputer is additionally furnished with the function of evaluating the component of temperature rise of a rotor and obtaining the resistance value of the rotor by the use of this component of temperature rise and the temperature detection signal of the temperature detector, to evaluate the optimum instantaneous current command by the use of the temperature-compensated resistance value, whereby the overvoltage and the insufficient torque of the induction motor can be obviated.

PREFERRED EMBODIMENTS OF THE INVENTION

Figure 1:
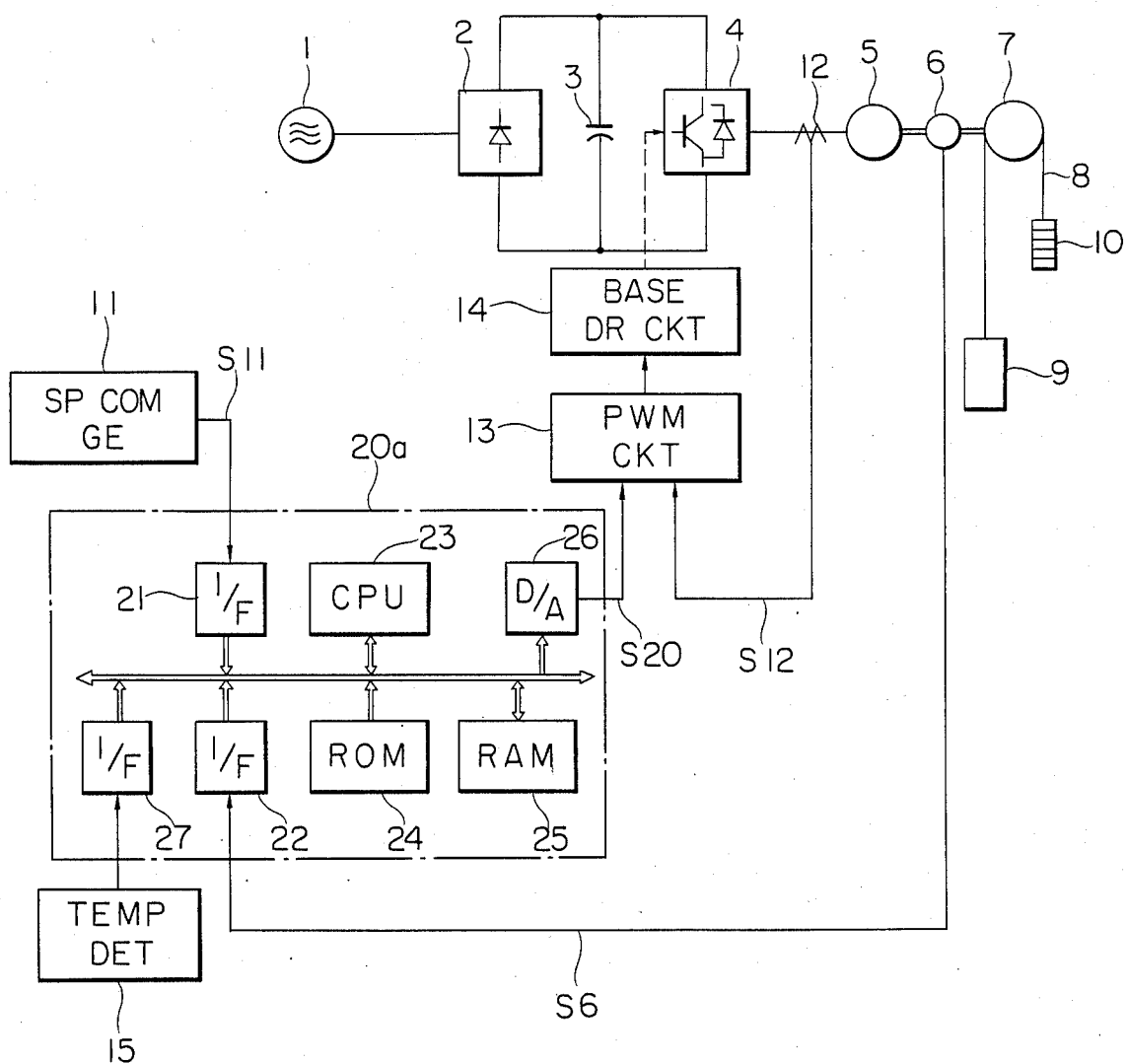
FIG. 1 is a block diagram showing the arrangement of an embodiment of the present invention.
Figure 5:
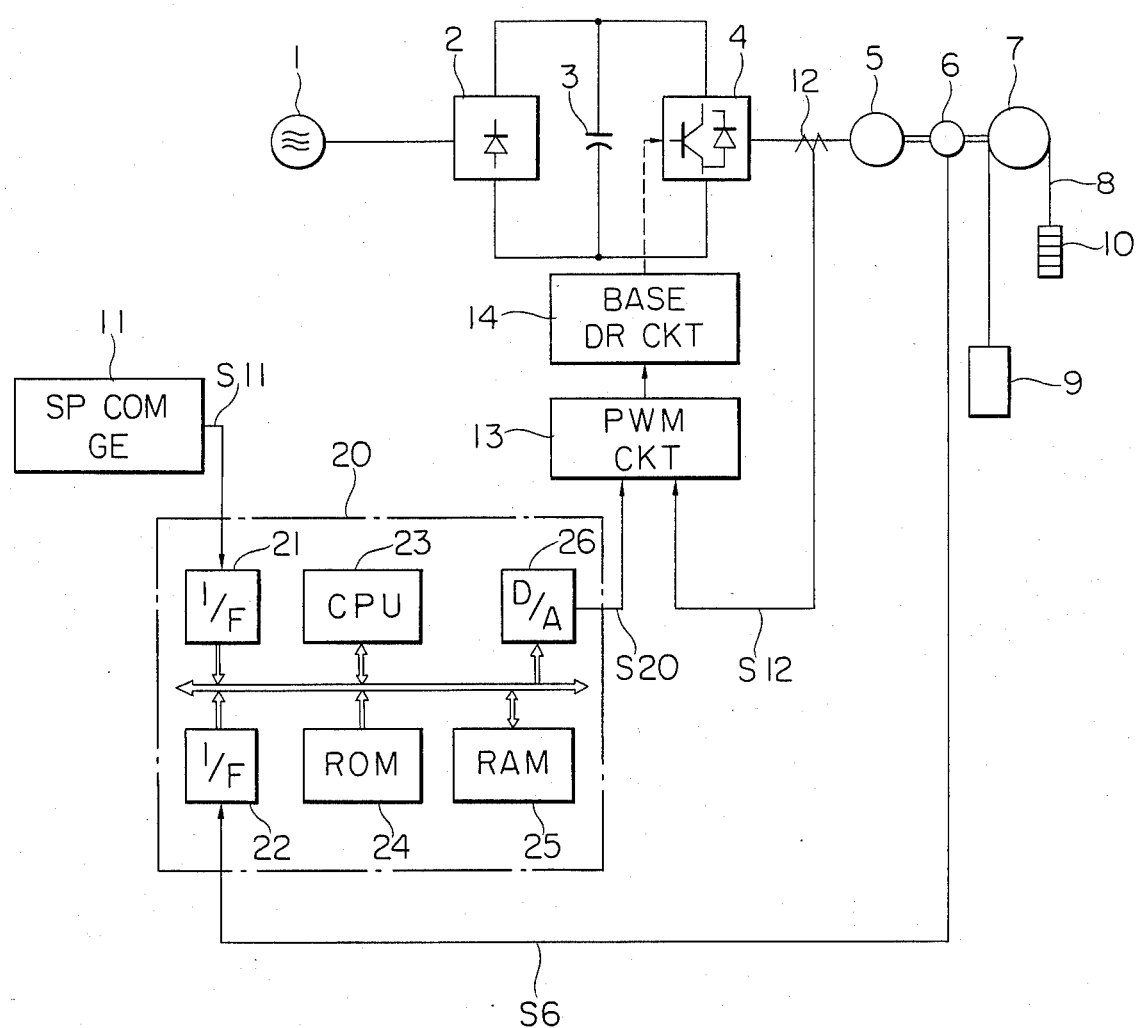
FIG. 5 is a block diagram showing the arrangement of a prior-art apparatus.

FIG. 1 is a block diagram which shows the arrangement of one embodiment of the present invention, and in which parts assigned the same symbols as in FIG. 5 are identical elements respectively.

In hardware, the embodiment differs from the arrangement of FIG. 5 in the point of being additionally provided with a temperature detector 15 which detects the ambient temperature of the induction motor 5, for example, the temperature of a machinery room, and an interface 27 which accepts the temperature detection signal of the temperature detector 15 into the microprocessor 23.

The operation of the present embodiment arranged as stated above will be described below by referring to a flow chart in FIG. 2 and a functional block diagram in FIG. 3, with the addition of the new constituents centered.

Now, letting $I_2$ denote the secondary current calculated in terms of the primary side, namely, the current of the rotor, the quantity of heat generation $P_w$ of the rotor is evaluated by the following equation:

$$P_w = m\gamma I_2^2 \quad (3)$$

where
m: number of phases on the primary side,
$\gamma$: secondary resistance calculated in terms of the primary side.

Accordingly, when the thermal time constant of the rotor is denoted by T and the radiation resistance thereof by $R_c$, the temperature rise $\Delta\theta\gamma$ of the rotor is found in accordance with the following equation:

$$\Delta\theta_\gamma = R_c \int_0^t \left(1 - e^{-\frac{t}{T}}\right) P_w dt \quad (4)$$

Besides, considering the fact that the temperature change of the machinery room is comparatively moderate, the temperature $\theta\gamma$ of the rotor is evaluated by:

$$\theta_\gamma = \int_0^t \left(1 - e^{-\frac{t}{T}}\right) dt + \theta_a \quad (5)$$

Here, $\theta_a$ denotes the temperature of the machinery room.

Figure 2:
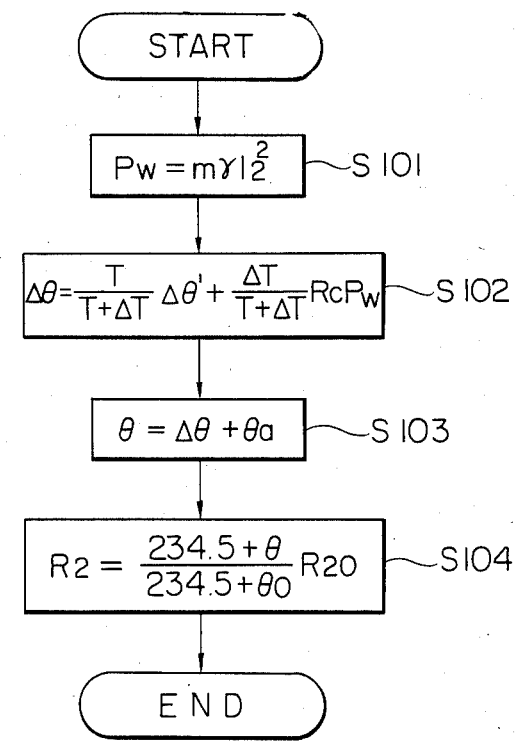
FIG. 2 is a flow chart for explaining the operation of the embodiment.

FIG. 2 shows one example of processing steps for calculating the resistance value of the rotor in a microcomputer 20a. First, the calculation of Eq. (3) is executed to obtain the quantity of heat generation $P_w$ of the rotor (S101). Subsequently, the temperature rise of the rotor is evaluated in accordance with the differential equation of Eq. (4) (S102). After the temperature of the rotor has been evaluated by executing the calculation of Eq. (5), the resistance value $R_2$ of the rotor is calculated using Eq. (2) (S103, S104).

This resistance value $R_2$ is none other than a value obtained by compensating the component of temperature rise ascribable to the ambient temperature of the induction motor and the current supplied to this induction motor.

Figure 3:
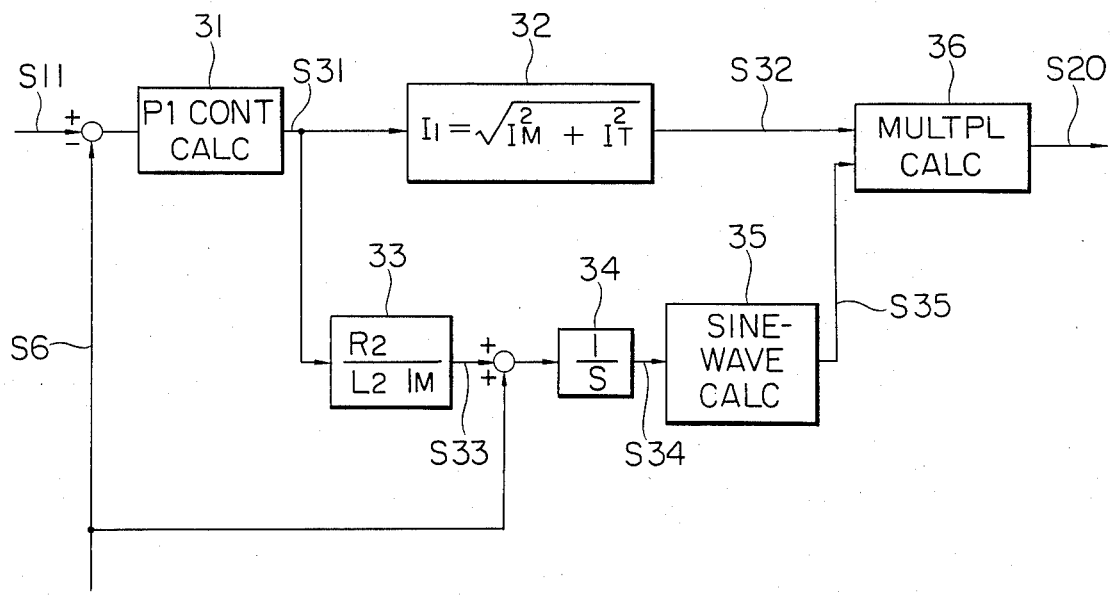
FIG. 3 is a functional block diagram for explaining the general operation of an arithmetic unit in the embodiment.

FIG. 3 is a functional block diagram for evaluating the instantaneous current command of the induction motor by the use of this resistance value.

Referring to the figure, the deviation between the speed detection signal S6 of the speed detector 6 and the speed command S11 of the speed command generator 11 is subjected to a PI control calculation by a PI (proportional-plus-integral) calculation block 31, to evaluate a torque current command S31 for producing a torque current $I_T$ corresponding to a required torque. Subsequently, in accordance with this torque current command S31, a primary current block 32 executes the calculation of the following equation so as to evaluate a primary current command S32:

$$I_1 = \sqrt{I_M^2 + I_T^2} \quad (6)$$

where $I_M$ denotes an exciting current component. Besides, a slip frequency block 33 evaluates a slip frequency command S33 in accordance with the calculation of the following equation on the basis of the torque current command S31 and the resistance value $R_2$ of the rotor explained with reference to FIG. 2:

$$\omega_s = \frac{R_2}{L_2 I_M} \cdot I_T \quad (7)$$

Next, the slip frequency command S33 is added with the speed detection signal S6 of the speed detector 6, and the phase angle command S34 of an output frequency is evaluated by an integral block 34. Subsequently, the phase angle command S34 is subjected to a sinusoidal wave calculation by a sinusoidal wave calculation block 35, the sinusoidal value command S35 and the aforementioned primary current command S34 are multiplied by a multiplication block 36, and the instantaneous current S20 is output from the microcomputer 20a through the D/A converter 26 shown in FIG. 1.

Thus, owing to the correction of the resistance value of the rotor, the optimum instantaneous current command is evaluated, and the overvoltage and the insufficient torque of the induction motor 5 are eliminated.

Figure 4:
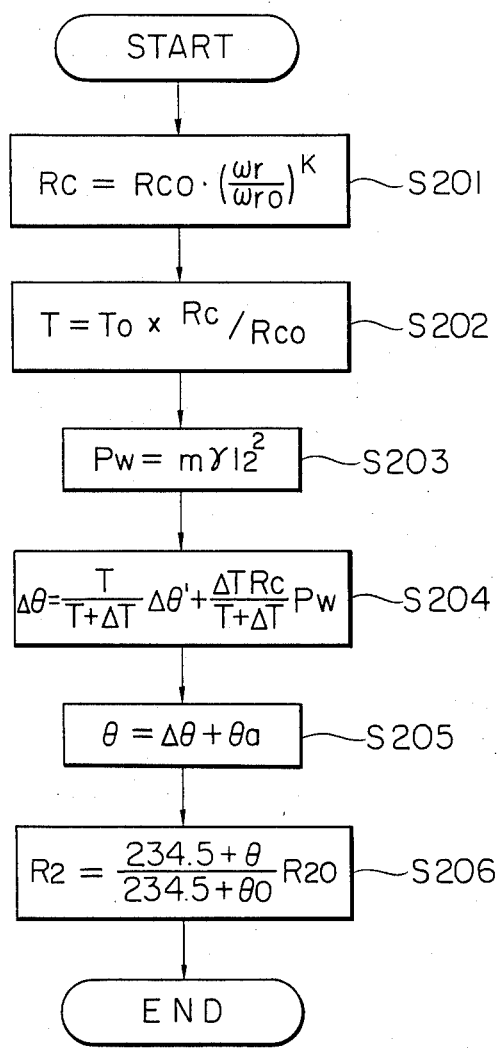
FIG. 4 is a flow chart for explaining another embodiment.

Now, FIG. 4 shows another embodiment of the present invention. Processing steps S203–S206 are quite the same as those S101–S104 shown in FIG. 2, respectively, and they are preceded by stages for evaluating the radiation resistance $R_c$ and the thermal time constant T.

This corresponds to the fact that, when the induction motor employed is of the self-ventilating type, the radiation resistance $R_c$ and the thermal time constant T varies depending upon the number of revolutions. More specifically, in a system such as the elevator wherein the running speed changes at every start, errors become large in the process of calculating the temperature when values obtained from an average running pattern are used. Particularly in the case of the self-ventilating type induction motor, therefore, the radiation resistance $R_c$ is evaluated in correspondence with the number of revolutions N by the following equation:

$$R_c = R_{co}\left(\frac{N_o}{N}\right) \quad 0.4 \text{ to } 0.5 \quad (8)$$

on the basis of which the thermal time constant T is subsequently evaluated by the following equation:

$$T = T_o \times \frac{R_c}{R_{co}} \quad (9)$$

whereby the temperature of the rotor is calculated at a higher precision.

Thus, the instantaneous current command which is higher in precision than that of the embodiment explained with reference to FIGS. 1 to 3 is attained.

Although, in each of the foregoing embodiments, the instantaneous current command has been evaluated using the microcomputer, there may be means to execute calculative operations similar to those stated above, that is, a current command calculating portion which evaluates a primary current command and a slip frequency command and multiplies them thereby to obtain an instantaneous current command, and a resistance value calculating portion which evaluates the component of temperature rise of a rotor by the use of the instantaneous current command and also calculates the resistance value of the rotor by the use of the evaluated component of temperature rise and a temperature detection signal.

As apparent from the above description, according to the present invention, a speed control apparatus for an elevator comprises a temperature detector for detecting the ambient temperature of an induction motor, and a resistance value calculating portion for calculating the resistance value of a rotor by the use of the temperature detection signal of the temperature detector and an instantaneous current command, so that the optimum temperature compensation is performed by taking into account both the component of temperature change in the surroundings of the induction motor and the component of temperature rise of the rotor, whereby the overvoltage and the insufficient torque of the induction motor can be reliably prevented.

We claim:

1. In a speed control apapratus for an elevator having an inverter which supplies alternating current to an induction motor for driving a cage of the elevator, a current command calculating portion which calculates using a speed command and a speed detection signal of the induction motor and a resistance value signal of a rotor of the induction motor, to evaluate an instantaneous current command of the induction motor, and a pulse width modulation circuit which subjects the inverter to a pulse width modulation control by the use of the instantaneous current command of the current command calculating portion and an output current detection signal of the inverter; a speed control apparatus for an elevator comprising a temperature detector which detects an ambient temperature of the induction motor, and a resistance value calculating portion which calculates a resistance value of the rotor by the use of the temperature detection signal of said temperature detector and which supplies the calculated resistance value to said current command calculating portion in order to evaluate the instantaneous current command.

2. A speed control apparatus for an elevator according to claim 1, wherein said temperature detector detects the temperature of a machinery room in which the motor is installed.

3. A speed control apparatus for an elevator according to claim 1, wherein said current command calculating portion evaluates a primary current command and a torque current command corresponding to a required torque of the induction motor on the basis of the speed command and the speed detection signal of the induction motor, evaluates a slip frequency command by the use of the torque current command and the resistance value signal of the rotor of the induction motor, and evaluates the instantaneous current command of the induction motor by the use of the slip frequency command, the speed detection signal and the primary current command.

4. A speed control apparatus for an elevator according to claim 1, wherein said resistance value calculating portion calculates a quantity of heat generation of the rotor of the motor, calculates a temperature rise of the rotor on the basis of the quantity of heat generation, and calculates the resistance value of the rotor by the use of the temperature rise value and the temperature detection signal.

5. A speed control apparatus for an elevator according to claim 4, wherein said resistance value calculating portion calculates the quantity of heat generation of the rotor by the use of current flowing through the rotor.

6. A speed control apparatus for an elevator according to claim 4, wherein said resistance value calculating portion adds the temperature rise value of the rotor and a temperature value indicated by the temperature detection signal, thereby to calculate the temperature of the rotor, and calculates the resistance value of the rotor by the use of the calculated temperature.

7. A speed control apparatus for an elevator according to claim 1, wherein the induction motor is of a self-ventilating type, and said resistance value calculating portion calculates the resistance value of the rotor by the use of a radiation resistance value and a thermal time constant corrected in accordance with a number of revolutions.

8. A speed control apparatus for an elevator according to claim 7, wherein said resistance value calculating portion calculates the temperature rise value of the rotor by the use of the corrected radiation resistance value and thermal time constant.

* * * * *